United States Patent Office 3,389,777
Patented June 25, 1968

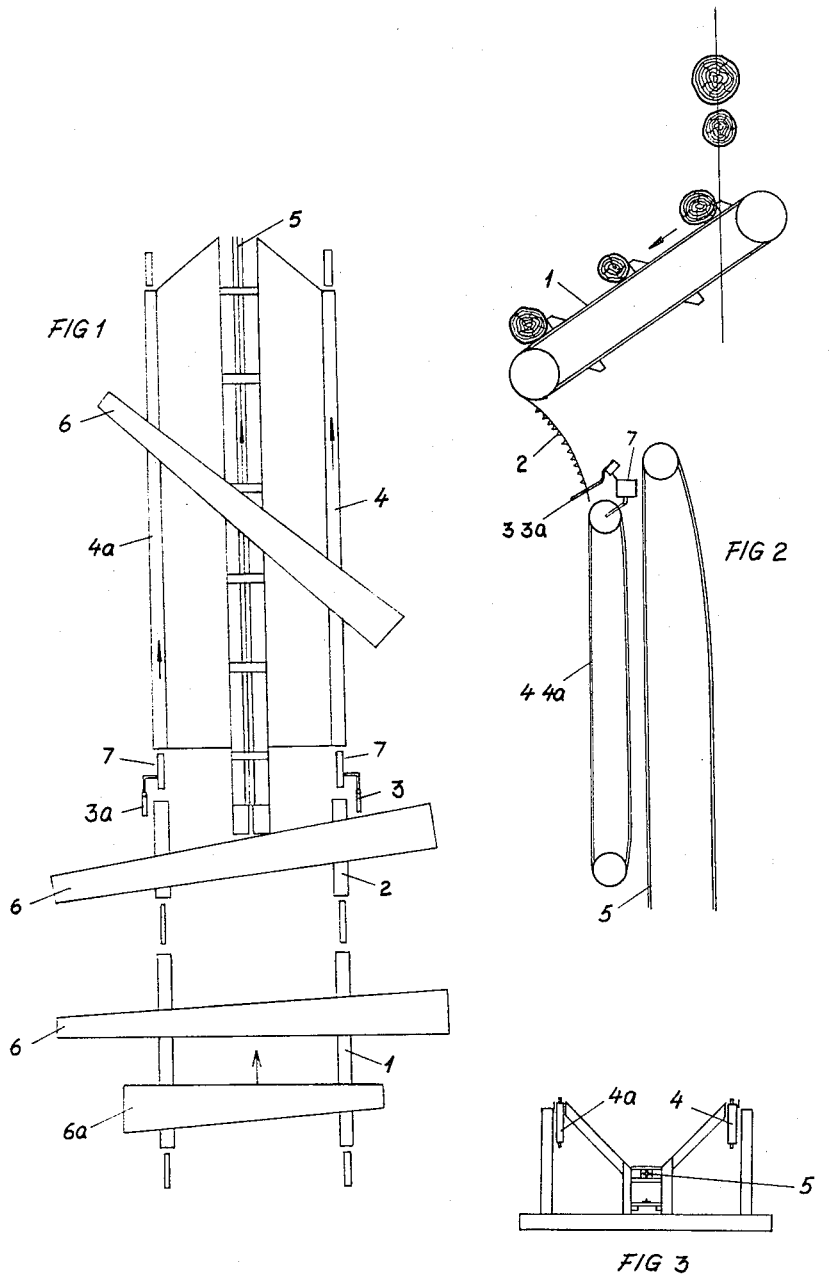

3,389,777
DEVICE FOR TURNING LOGS
Alpo Rysti, Frisans, Finland, assignor to Sateko Oy, Helsinki, Finland, a corporation of Finland
Filed Oct. 12, 1966, Ser. No. 586,118
1 Claim. (Cl. 198—33)

ABSTRACT OF THE DISCLOSURE

A device for turning logs includes a log lift transporting the logs to a sloping ramp from which they roll to two parallel transporting conveyors. Log engaging feelers are situated in front of each conveyor and are coupled with means driving the conveyors in such manner that the relative speeds of the two conveyors are varied depending upon the position of the logs until they assume the proper required position.

---

The present invention refers to a device for turning logs which have been arranged to be fed crosswise by a conveyor in such manner that the top ends of the logs point in different directions mixed at random, the logs being arranged to be turned all in the same direction e.g., all butt ends pointing one way, for transport to a sawmill or for other processing.

The invention is characterized in that the logs have been arranged to roll to meet actuating contacts or tactile organs provided in front of them and connected to the turning organs, that upon actuation of one of the tactile organs the turning organ or organs are automatically coupled to perform a turning operation in a given direction and in the opposite direction when the other tactile organ is actuated, and that the butt ends of the logs have been arranged to actuate the proper tactile organ so that the turning organs will execute the desired turning operation.

The invention shall be described in the following with reference to the attached drawings, illustrating one embodiment of the invention.

In the drawing, FIG. 1 shows an arrangement according to the invention, viewed from above, while FIG. 2 is a view of the arrangement according to FIG. 1, seen from one side. FIG. 3 shows the arrangement as viewed from the end of the turning conveyor.

In the drawing, 1 indicates a conveyor (a so-called "kiramo" log lift), by the aid of which the logs are transferred in transverse position to the arrangement according to the invention. The conveyor 1 has been arranged to deposit the logs on a sloping transport ramp 2, along which they roll up to two substantially parallel transport tracks 4 and 4a consisting of chain conveyors, belts or equivalent. The transport tracks 4 and 4a have been arranged to turn the stocks through approximately 90 degrees, whereupon they fall down upon a remover conveyor 5 provided between the transport tracks 4 and 4a, in connection with which sloping slide surfaces may be provided for delivery of the logs to conveyor 5. The turning action of the transport tracks 4 and 4a has been arranged to be achieved by making the tracks have feed motions of different speed. When, for instance, part of the logs arriving at the transport tracks have their butt end on the right (when viewed in the direction of motion), they have to be turned around their butts in order that these logs might be deposited with their top ends first on the remover conveyor. On the other hand when logs pointing their butt end to the left come into contact with the transport tracks 4 and 4a, the transport tracks should in their case produce a turning motion in opposite direction in order to deposit them with their top ends first on the remover conveyor 5. This has been achieved, according to the present invention, by providing at a point before the transport tracks 4 and 4a tactile organs or log engaging feelers 3 and 3a, which are actuated by the logs and which are arranged in their turn to cause the transport tracks 4 and 4a to produce a log-turning motion. When the log 6, the butt end of which points to the right when viewed in the transport direction, arrives at the transport tracks 4 and 4a, this log actuates the tactile organ 3, by the action of which transport track 4 is coupled by any suitable device 7 to provide a feed motion e.g. at the speed $n$ and transport track 4a to provide a higher feed speed, e.g. $2n$. This results in the log 6 being turned in the manner shown in FIG. 1 to be substantially parallel to the direction of the transport tracks 4 and 4a and ultimately to be deposited on the conveyor 5 between them. If, on the other hand, the next log 6a has opposite orientation when it arrives at the transport tracks 4 and 4a, it will actuate the tactile organ 3a. In that case the transport track 4 has been arranged to be coupled by the device 7 so that it provides a feed motion e.g. at the speed $2n$, while transport track 4a will move at the speed $n$. The log 6a is then turned around its butt end again and comes to rest on the conveyor 5 with its top end first. In order to make the logs 6 and 6a thus appropriately to actuate the tactile organs, they are caused to roll down the ramp 2 to the transport tracks 4 and 4a. At this, one of the ends of the log, that one which is larger in diameter, will roll faster and it will consequently touch the requisite tactile organ as has been set out above. In order to ensure that this will really happen, the surface of the rolling ramp or equivalent 2 has been suitably provided with protuberances or some other kind of friction surfacing.

It is to be understood that the tactile organs 3 and 3a have been arranged to couple the transport tracks 4 and 4a by the device 7 to provide requisite speeds of feed, depending on whether one desires to feed the logs with their top ends of their butt ends first.

Instead of using the speeds stated above, they may also be made to perform some other motions suitable in relation to each other in order to produce the desired turning effect. The transport tracks 4 and 4a may be so arranged that one of them will move forward at considerable speed, while the other is stationary or uncoupled or possibly moves at some minor speed in the direction opposite to the transporting direction.

Turning of the logs may also be suitably arranged in such manner that the function is controlled by a person e.g. stationed in front of the transport tracks 4 and 4a.

According to another turning device of the present invention logs may be turned e.g. to have their butt ends pointing in one direction and it consists of a transport track for transporting of the logs in transverse direction, together with two stops placed side by side and suitably close to the ends of the logs travelling on the track, and which can be independently raised or lowered, and of a sloping guide ramp located after them and which is open in its centre and so arranged that it guides the logs transported onto them by a conveyor to a longitudinal conveyor intended for further transport of the logs, now most suitably with their butt ends first. According to the present invention, tactile organs are provided in front of the stops and such arrangements have been made that the butt ends of the logs, which will roll ahead, first actuate one of the tactile organs so that consequently the stop on the desired side, e.g. that closer to the top end, is raised while the other stop is kept down. The logs will then be turned around the stop at their top ends and after such turning will be deposited on the longitudinal conveyor for further transport.

Another embodiment of the present invention is somewhat different from the last-mentioned arrangement. The arrangement has only one stop, which has been immovably mounted (i.e., always in operating position), and that the stop has been placed in front of said longitudinal conveyor (or remover conveyor). In front of this last-mentioned stop there is a transversal conveyor, e.g. a roll conveyor, and in front of this there are tactile organs according to the present invention, suitably placed close to the ends of the logs to be turned. The logs have been arranged in previously described manner to actuate these tactile organs, either one or the other, and the organs are arranged to put the last-mentioned transverse conveyor into motion in such manner that it displaces the arriving logs transversally with respect to the direction in which they arrive, that is, a short distance in their longitudinal direction (to the right or left), resulting in that the logs are turned around said stop in their further course of rolling.

The transport ramp guiding the logs to the tactile organs shall suitably slope downward in above-described manner and it shall be provided with a suitable friction surface.

I claim:

1. A device for turning logs, comprising a log lifting conveyor, a sloping transport ramp, two spaced parallel endless transport tracks, said transport ramp being located between said conveyor and said tracks for receiving logs raised by said conveyor and depositing them upon said tracks, a separate log engaging feeler situated adjacent each track, means connecting said feelers with said tracks for moving said tracks at relatively different speeds, depending upon the position of the log which has engaged one of said feelers, a second conveyor located between said tracks, and means constituting sloping surfaces extending downwardly from said tracks to said second conveyor for transmitting logs from said tracks to said second conveyor.

References Cited

UNITED STATES PATENTS 2,845,164  7/1958  Stahl _____ 198—33

FOREIGN PATENTS 1,028,495  4/1958  Germany.

EDWARD A. SROKA, *Primary Examiner.*